United States Patent [19]

Kume et al.

[11] Patent Number: 5,030,596
[45] Date of Patent: Jul. 9, 1991

[54] SINTERED ARTICLE OF DIAMOND AND METHOD FOR PRODUCTION THEREOF

[75] Inventors: Shoichi Kume, Tsushima; Haruo Yoshida; Kazutaka Suzuki, both of Nagoya; Yoshio Tasaki, Nagoya; Shiro Ikuta, Komaki; Masamitu Ishikawa; Michihide Machida, both of Nagoya, all of Japan

[73] Assignees: Agency of Industrial Science & Technology; Ministry of International Trade & Industry, Tokyo, Japan

[21] Appl. No.: 444,718

[22] Filed: Dec. 1, 1989

Related U.S. Application Data

[62] Division of Ser. No. 216,307, Jul. 8, 1988, Pat. No. 4,902,652.

[30] Foreign Application Priority Data

Jul. 10, 1987 [JP] Japan .................................. 62-173386

[51] Int. Cl.$^5$ ............................................. C04B 35/56
[52] U.S. Cl. ....................................... 501/90; 501/87; 501/99; 51/309
[58] Field of Search ................. 501/87, 90, 99; 51/309

[56] References Cited

U.S. PATENT DOCUMENTS

| | | | |
|---|---|---|---|
| 4,084,942 | 4/1978 | Villalobos | 51/309 X |
| 4,124,401 | 11/1978 | Lee et al. | 501/90 |
| 4,167,399 | 9/1979 | Lee et al. | 501/90 |
| 4,695,321 | 9/1987 | Akashi et al. | 501/99 X |

Primary Examiner—Karl Group
Attorney, Agent, or Firm—Oblon, Spivak, McClelland, Maier & Neustadt

[57] ABSTRACT

A sintered article of diamond is obtained by coating the surface of diamond particles with 30 to 0.1% by volume, based on the total volume of the diamond particles and aids, of at least one member selected from the group consisting of the transition metals of Groups 4a, 5a, and 6a in the Periodic Table of Elements and boron and silicon, and sintering the coated diamond particles under conditions of high pressure and high temperature, which sintered article consists of 70 to 99.8% by volume of diamond and 30 to 0.2% by volume of the carbide of the coating substance. A method for the production of the sintered article of diamond is also disclosed.

2 Claims, 2 Drawing Sheets

SINTERED ARTICLE OF DIAMOND AND METHOD FOR PRODUCTION THEREOF

This is a division of application Ser. No. 07/216,307, filed on July 8, 1988 U.S. Pat. No. 4,902,652.

BACKGROUND OF THE INVENTION

1. Field of the Invention

This invention relates to a novel sintered article of diamond for use in tools and the like and a method for the production thereof.

2. Prior Art Statement

Diamond possesses many outstanding qualities originating in its covalent bond. Owing to the enormous capacity for covalent bond, it possesses an extremely small self-diffusion coefficient and exhibits little sintering property. Diamond entails the disadvantage that it is stable only under high pressure (metastable under the conditions of normal room temperature and normal pressure) and undergoes graphitization at elevated temperatures when the pressure is insufficient. For diamond to be sintered in the absence of a sintering aid, it requires a very high temperature of 2,440° K. (about 2,170° C.) and, at the same time, necessitates an extremely high pressure of 8.5 GPa (85,000 atmospheres). These conditions are extreme and are unfit for commercial production of any material.

As a means for producing a sintered article of diamond without entailing graphitization, there is known the method which comprises mixing diamond powder with about 20% by volume, based on the total volume of the diamond powder and aids, of a metal such as cobalt, iron, or nickel which is capable of acting as a solvent for diamond and then sintering the resultant mixture. In this method, the sintering proceeds in a liquid phase with the aforementioned metal functioning as a binder for diamond. This sintering can be attained under conditions of relatively high feasibility, namely under a low pressure on the order of 5 to 6 GPa and at a low temperature not exceeding 1,600° C. [Japanese Patent Publication SHO 39(1964)-20483 and H. Katzman and W. F. Libby, "Science", 172, 1132 (1971)]. In the sintered article obtained by this method, diamond powder is bound to one another mainly with a low melting point metal phase. When this sintered article is exposed to a high temperature, therefore, it suffers from a conspicuous deterioration of mechanical property due to softening of the metal phase. During the course of the sintering, diamond is dissolved and recrystallizes and this phenomenon induces abnormal growth of powder of diamond and formation of pools of molten metal. The diamond powder and molten metal pools cause a decline in the strength of the sintered article. When the sintering is carried out in the presence of the aforementioned solvent metal as an aid, the degradation of the high-temperature strength of the sintered article cannot be precluded.

OBJECT AND SUMMARY OF THE INVENTION

An object of this invention is to provide a sintered article of diamond of outstanding high-temperature strength and a method for the production of the sintered article of diamond under industrially practicable conditions without entailing graphitization.

The object described above is accomplished by a sintered article of diamond, produced by sintering under conditions of high pressure and high temperature diamond powder having the surface thereof uniformly coated with 30 to 0.1% by volume, based on the total volume of diamond powder and aids, of at least one member selected from the group consisting of the transition metals of Groups 4a, 5a, and 6a in the Periodic Table of Elements, and boron and silicon, which sintered article consists of 70 to 99.8 volume % of diamond and 30 to 0.2 volume % of the carbide of the coating substance mentioned above. The object is further accomplished by a method for the production of the sintered article of diamond, characterized by uniformly coating the surface of diamond powder with at least one member selected from the group consisting of the transition metal of Groups 4a, 5a, and 6a in the Periodic Table of Elements, and boron and silicon and sintering the coated diamond powder under the conditions of high pressure and high temperature falling in the ranges necessary for stability of diamond.

The above and other objects and features of the invention will become more apparent from the following detailed description with reference to the accompanying drawings.

DETAILED DESCRIPTION OF THE PREFERRED EMBODIMENTS

Figure 1:
FIG. 1 is an electron micrograph illustrating at 250 magnifications a polished surface of a sintered article of diamond of this invention produced by the method of this invention described in Example.

Now, the present invention will be described more specifically below. The sintered article of diamond of the present invention is produced by a method which uses at least one member selected from the group consisting of the transition metals of Groups 4a, 5a, and 6a of the Periodic Table of Elements, and boron and silicon in place of the solvent metal used in the conventional sintered article of diamond described above and which comprises uniformly coating the surface of diamond powder with 30 to 0.1% by volume, based on the total volume of the diamond powder and aids, of the selected substance, and sintering the coated diamond powder in a powdery state or in a molded state under the conditions of high pressure and high temperature falling in the ranges for stability of diamond. The coating mentioned above can be easily carried out by the physical vapor deposition (PVD) method. The term "PVD method" encompasses the ion spattering method (hereinafter referred to simply as "spattering method"), the vacuum deposition method, and the ion plating method, for example.

During the sintering, the coating material selected from among the aforementioned transition metals, boron and silicon undergoes carbonization in a solid phase and exhibits a combined effect of curbing graphitization of diamond and promoting the sintering. The sintered article obtained by this method experiences only slight degradation of mechanical properties at elevated temperatures.

It is necessary to uniformly coat the diamond powder with the coating material selected from the aforementioned transition metals, boron and silicon and it is sufficient that the amount of the coating material falls in the range of 30 to 0.1% by volume based on the volume of the diamond powder.

The amount of the coating material deposited on the diamond powder can be adjusted accurately by controlling the time of deposition.

The finer the diamond powder is, the more suitable it is for use with this invention.

The sintered article of diamond which is produced by the method of this invention consists of 70 to 99.8% by volume of diamond and 30 to 0.2% by volume of the carbide of the coating material selected from among the aforementioned transition metals, boron and silicon. It undergoes virtually no degradation of strength at elevated temperatures.

It should be noted specifically at this point that since the sintering proceeds in the solid phase, unlike the case of the conventional liquid-phase sintering using a solvent metal, the diamond powder must be mixed uniformly with at least one material selected from among the aforementioned transition metals, boron and silicon. If the powdered materials added to the diamond powder should agglomerate and be present in the form of coarse masses among the diamond particles or distribute themselves unevenly among the diamond particles, they can no longer be expected to manifest fully their combined effect of curbing the graphitization and promoting the sintering. The fact that the surface of the diamond particles is coated uniformly by the PVD method, for example, substantially precludes the aforementioned maldistribution of the added powdered materials among the diamond particles, ensures the prevention of the surface of diamond particles from graphitization, and effectively enhances the high-temperature strength of the sintered article itself.

In particular, if a very small amount of powdered binding material should be merely uniformly mixed with the diamond powder, the added material would inevitably be present in some of the interstices among the diamond particles and be absent from others even if ideally uniform dispersion is realized. Moreover, even ideal dispersion is not in fact attainable since the added material tends to agglomerate and persist in the form of coarse masses among the diamond particles and further because uniform mixing itself is difficult to realize. The method of the present invention overcomes these problems by first coating the diamond particles with the added material thus ensuring that in the ensuing sintering step the added material will be uniformly distributed among the diamond particles even when the amount of added material is small.

Now, the present invention will be described below with reference to working examples. When diamond particles are coated with tungsten by the spattering method at the rate of 5% by volume based on the total volume of diamond particles and aids, there can be produced, even under the sintering conditions of 5.5 GPa and 1,500° C., a sintered article of diamond of high hardness virtually free from high-temperature strength loss. The effect of the addition of tungsten is clearly recognized even when the amount of tungsten added is only 0.1% by volume.

The sintered article of diamond is specifically produced as follows. Diamond particles in a suitable amount are placed on a plate and are coated with a suitable amount of one member selected from the group consisting of the transition metals of Groups 4a, 5a, and 6a in the Periodic Table of Elements and boron and silicon by a PVD method (such as, for example, the ion spattering method). The diamond particles thus coated, for example, are molded in a metal die at normal room temperature and sintered under conditions of high pressure and high temperature.

The high-pressure apparatus for the sintering may be any of the conventional types such as the cubic type, the tetra type, the girdle type, and the belt type.

The production of the sintered article by the use of the cubic type high-pressure apparatus will be described, for example. First, diamond powder is die molded in the form of pellets. The diamond pellets are wrapped in a zirconium (Zr) foil and encased in a boron nitride (BN) mold, with a graphite tube heater installed on the outside. To ensure uniform heating, the heater is desired to be in a stepped structure having a protuberance in the central part thereof. The heater may be otherwise in any structure other than the stepped structure, on condition that it should be capable of uniformly applying heat to the sintered article. Outside the heater, pyrophillite pieces deprived of water of crystallization by three hours' heating at 700° C. are placed as solid pressure medium. The pressure and temperature for the sintering are desired to fall in the ranges for stability of diamond. The conditions to be employed may deviate more or less from the ranges for stability, because the sintering is carried out without use of any solvent metal.

Now, a working example will be cited below in combination with a comparative experiment.

EXAMPLE

By the PVD method, about 0.5 g of diamond particles were coated with 0.85% by volume of tungsten (W). The coated particles were compression molded in the shape of a cylinder 6 mm in outside diameter and 2 mm in height. The cylinder was wrapped in a zirconium (Zr) foil, embedded in pressure media having a boron nitride (BN) mold disposed on the outside, and vacuum dried overnight at 200° C. under a pressure of $10^{-3}$ torr to expel water and other low boiling impurities. The dried molded cylinder was set in a cubic type high-pressure apparatus. Then, the inner pressure of the apparatus was increased to 5.5 GPa at normal room temperature and then the inner temperature thereof was elevated to 1,500° C., held at this level for 30 minutes, then lowered, whereafter the inner pressure was lowered. The surface of the sintered article was ground with diamond paste. Scanning electron micrographs illustrating the ground surface of the sintered article at 250 magnifications and 10,000 magnifications are shown in FIG. 1 and FIG. 2, respectively.

Figure 2:
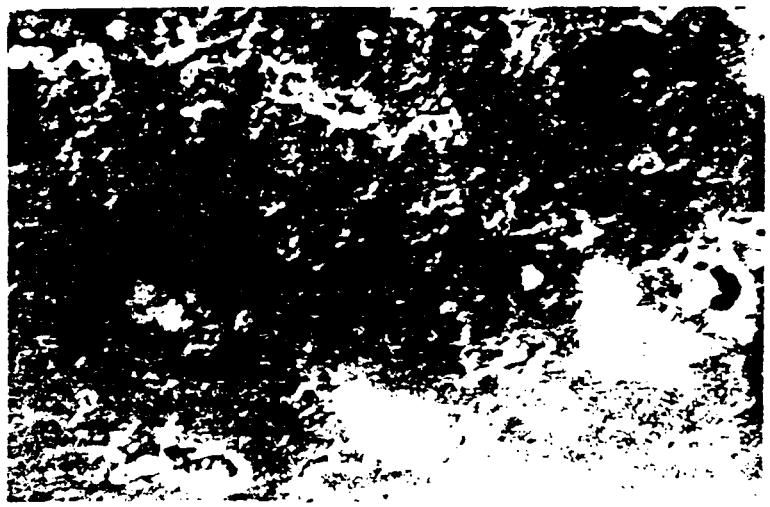
FIG. 2 is an electron micrograph illustrating at 10,000 magnifications the same polished surface of the sintered article of diamond.

The portions of the photographs of FIG. 1 and FIG. 2 appearing in white are those rich in tungsten. They were confirmed by X-ray diffraction to be formed of tungsten carbide. The results of X-ray diffraction show that an increase in the amount of tungsten added resulted in an increase in the peaks of tungsten carbide and a sharp decrease in the peaks of graphite. The peaks of graphite disappeared when the amount of added tungsten was 5% by volume. These results indicate that the coating of tungsten is highly effective for curbing graphitization of diamond.

When diamond particles coated with 0.85% by volume of tungsten were sintered under 5.5 GPa at 1,500° C. for 30 minutes and ground with diamond paste, the sintered article consequently produced showed high hardness, Hv (0.5/10)≃5,200.

COMPARATIVE EXPERIMENT

Figure 3:
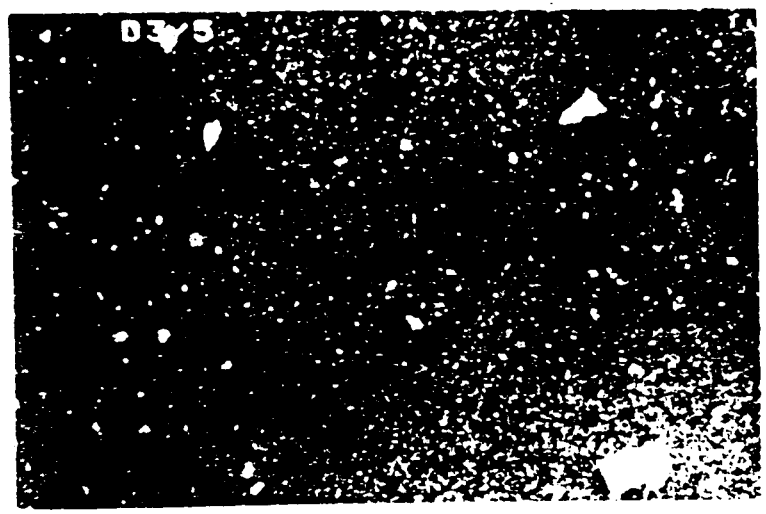
FIG. 3 is an electron micrograph illustrating at 250 magnifications a polished surface of a sintered article of diamond produced by the method described in Comparative Experiment.
Figure 4:
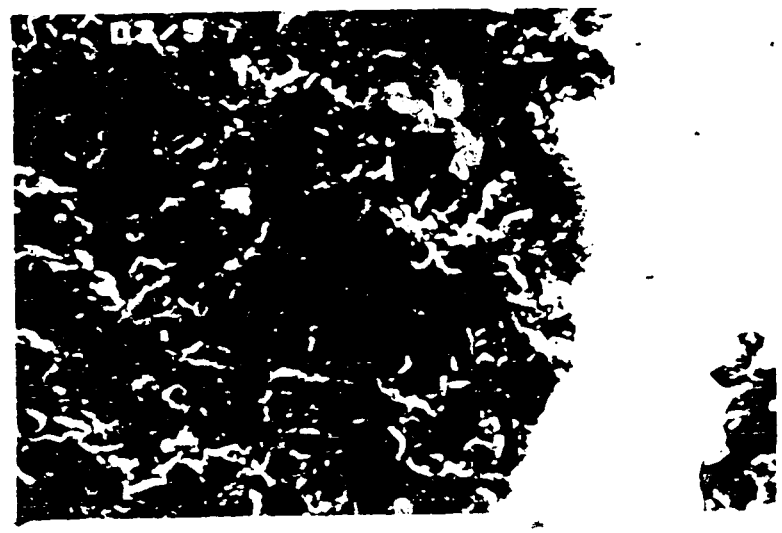
FIG. 4 is an electron micrograph illustrating at 10,000 magnifications the same polished surface of the sintered article of diamond.

The same diamond particles as used in the Example were wet mixed thoroughly with 0.85% by volume of tungsten having an average particle diameter of 0.89 μm. The resultant mixture was dried and then sintered by following the procedure of the preceding Example. Electron micrographs illustrating the ground surface of the sintered article consequently obtained at 250 magnifications and 10,000 magnifications are shown in FIG. 3 and FIG. 4 respectively. In the photographs, agglomerated masses of tungsten about 10 μm in diameter are found despite the tungsten having been thoroughly mixed. The sintered article showed a very low hardness, Hv (0.5/10)≃3,800, as compared with that of the sintered article produced by the PVD method.

As described in detail above, this invention, owing to the use of a suitable sintering aid, permits a sintered article of diamond substantially safe from degradation of mechanical properties and loss of high-temperature strength to be produced under relatively easily attainable conditions of pressure and temperature without entailing graphitization of diamond.

What is claimed is:

1. A sintered article of diamond, produced by a method which comprises (i) uniformly coating, by a method selected from the group consisting of ion sputtering and ion plating, the surface of diamond particles with at least one member selected from the group consisting of the transition metals of Groups 4a, 5a, and 6a in the Periodic Table of Elements, boron, and silicon, to obtain coated diamond particles provided with 30 to 0.1% by volume of a coating layer; and (ii) solid-phase sintering said coated diamond particles, under temperature and pressure conditions falling in the range in which diamond remains stable, to obtain a sintered article consisting of 70 to 99.8 volume % of diamond and 30 to 0.2 volume % of the carbide of said at least one member.

2. A sintered article of diamond, produced by a method which comprises (i) uniformly coating, by a method selected from the group consisting of ion sputtering and ion plating, the surface of diamond particles with tungsten, to obtain coated diamond particles provided with 30 to 0.1% by volume of a coating layer; and (ii) solid-phase sintering said coated diamond particles, under temperature and pressure conditions falling in the range in which diamond remains stable, to obtain a sintered article consisting of 70 to 99.8 volume % of diamond and 30 to 0.2 volume % of the carbide of tungsten.

* * * * *